US012060855B2

United States Patent
Mori

(10) Patent No.: US 12,060,855 B2
(45) Date of Patent: Aug. 13, 2024

(54) FUEL INJECTION DEVICE

(71) Applicant: TOYOTA JIDOSHA KABUSHIKI KAISHA, Toyota (JP)

(72) Inventor: Sachio Mori, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/307,858

(22) Filed: Apr. 27, 2023

(65) Prior Publication Data

US 2024/0077050 A1    Mar. 7, 2024

(30) Foreign Application Priority Data

May 20, 2022    (JP) ................................. 2022-082929

(51) Int. Cl.
*F02M 21/02*    (2006.01)
*F02M 61/10*    (2006.01)

(52) U.S. Cl.
CPC ........ *F02M 21/0257* (2013.01); *F02M 61/10* (2013.01)

(58) Field of Classification Search
CPC ............... F02M 51/02; F02M 51/0257; F02M 51/0632; F02M 61/10; F02M 61/184; F02M 61/1806; F02M 61/1833; F02M 61/188; F02M 61/1853
See application file for complete search history.

(56) References Cited

U.S. PATENT DOCUMENTS

| | | | | |
|---|---|---|---|---|
| 6,138,639 | A * | 10/2000 | Hiraya | F02B 23/104 |
| | | | | 123/301 |
| 9,310,010 | B2 * | 4/2016 | Cooke | F02M 61/08 |
| 11,060,476 | B2 * | 7/2021 | Ogata | F02D 37/02 |
| 2004/0056114 | A1 * | 3/2004 | Peterson, Jr. | F02M 61/1853 |
| | | | | 239/533.2 |
| 2006/0131447 | A1 * | 6/2006 | Masuda | F02M 61/1853 |
| | | | | 239/533.2 |
| 2007/0235086 | A1 * | 10/2007 | Hornby | F02M 51/0671 |
| | | | | 251/129.09 |
| 2009/0242670 | A1 * | 10/2009 | Kato | F02M 61/168 |
| | | | | 239/584 |

(Continued)

FOREIGN PATENT DOCUMENTS

JP    2017-125475 A    7/2017

*Primary Examiner* — Logan M Kraft
*Assistant Examiner* — Johnny H Hoang
(74) *Attorney, Agent, or Firm* — Oblon, McClelland, Maier & Neustadt, L.L.P.

(57) ABSTRACT

A fuel injection device includes a fuel injection valve at a position corresponding to a portion between intake ports in an internal combustion engine. The fuel injection valve includes a body and a needle inside the body. The fuel injection valve is disposed closer to a piston of the internal combustion engine than the intake ports are to the piston. A single fuel injection passage for conducting gaseous fuel is present between a valve seat of the fuel injection valve and a combustion chamber of the internal combustion engine. The flow cross section of the gaseous fuel in the fuel injection passage is larger on a side closer to the piston of the internal combustion engine than on a side closer to an ignition plug of the internal combustion engine over a specified length in an extending direction of the fuel injection passage.

4 Claims, 5 Drawing Sheets

(56) References Cited

U.S. PATENT DOCUMENTS

| | | | |
|---|---|---|---|
| 2010/0051728 A1* | 3/2010 | Hicks | F02M 69/00 |
| | | | 239/597 |
| 2010/0237174 A1* | 9/2010 | Oomori | F02M 51/0675 |
| | | | 239/533.12 |
| 2013/0216963 A1* | 8/2013 | Sanderson | F23D 14/24 |
| | | | 431/185 |
| 2015/0136877 A1* | 5/2015 | Sakata | F02M 51/0632 |
| | | | 239/584 |
| 2016/0186632 A1* | 6/2016 | Cooke | F16L 41/02 |
| | | | 137/605 |

* cited by examiner

FUEL INJECTION DEVICE

BACKGROUND

1. Field

The present disclosure relates to a fuel injection device.

2. Description of Related Art

One known type of fuel injection device for an internal combustion engine includes a fuel injection valve that injects fuel into the combustion chamber of the internal combustion engine. The fuel injection valve includes a body and a needle inside the body, and closes by pressing the needle against a valve seat. On the other hand, when the needle is moved away from the valve seat, the fuel injection valve opens. This allows fuel to be injected from the fuel injection valve into the combustion chamber.

The fuel injection valve disclosed in Japanese Laid-Open Patent Publication No. 2017-125475 includes a valve seat formed at an opening of an injection hole formed in a body. A valve member formed at a distal end of a needle of the fuel injection valve is pressed against the valve seat. When the needle is moved in a direction in which the needle protrudes from the fuel injection valve, the valve member separates from the valve seat. As a result, the fuel injection valve opens. At this time, the fuel is injected from between the valve seat and the valve member.

Further, in the above-described fuel injection valve, the shape of the opening of the injection hole is elliptical. Accordingly, when the movement amount (lift amount) of the needle from the position at which the valve member of the needle is pressed against the valve seat is small, fuel is likely to be injected in the direction of the major axis of the opening of the injection hole, and is unlikely to be injected in the direction of the minor axis of the injection hole. By utilizing such adjustment of the fuel injection direction in the fuel injection valve, it is possible to make fuel less likely to strike members such as the intake valve and the exhaust valve of the internal combustion engine.

However, although the adjustment of the injection direction of fuel from the fuel injection valve in Japanese Laid-Open Patent Publication No. 2017-125475 is effective when the lift amount of the needle is small, it is difficult to effectively perform the adjustment when the lift amount of the needle is large. This is because when the lift amount of the needle is large, the flow rate of the fuel passing between the valve seat and the valve member is large, and thus the influence of the shape of the opening of the injection hole on the fuel injection direction is small.

When gaseous fuel having a low density is injected from the fuel injection valve, it is necessary to increase the lift amount of the needle in order to ensure a necessary fuel injection amount. Therefore, it is difficult to effectively adjust the injection direction of the gaseous fuel from the fuel injection valve. As a result, the gaseous fuel injected from the fuel injection valve may easily hit members such as an intake valve and an exhaust valve in the internal combustion engine.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a fuel injection device includes a fuel injection valve disposed at a position in an internal combustion engine that corresponds to a portion between intake ports. The fuel injection valve includes a body and a needle inside the body. The fuel injection valve is configured to close by pressing the needle against a valve seat, and open by moving the needle away from the valve seat, thereby injecting gaseous fuel into a combustion chamber of the internal combustion engine. The fuel injection valve is disposed closer to a piston of the internal combustion engine than the intake ports are to the piston. A single fuel injection passage for conducting the gaseous fuel is present between the valve seat and the combustion chamber. A flow cross section of the gaseous fuel in the fuel injection passage is larger on a side closer to the piston of the internal combustion engine than on a side closer to an ignition plug of the internal combustion engine over a specified length in an extending direction of the fuel injection passage.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described.

Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A fuel injection device according to a first embodiment will now be described with reference to FIGS. 1 to 8.

Figure 1:
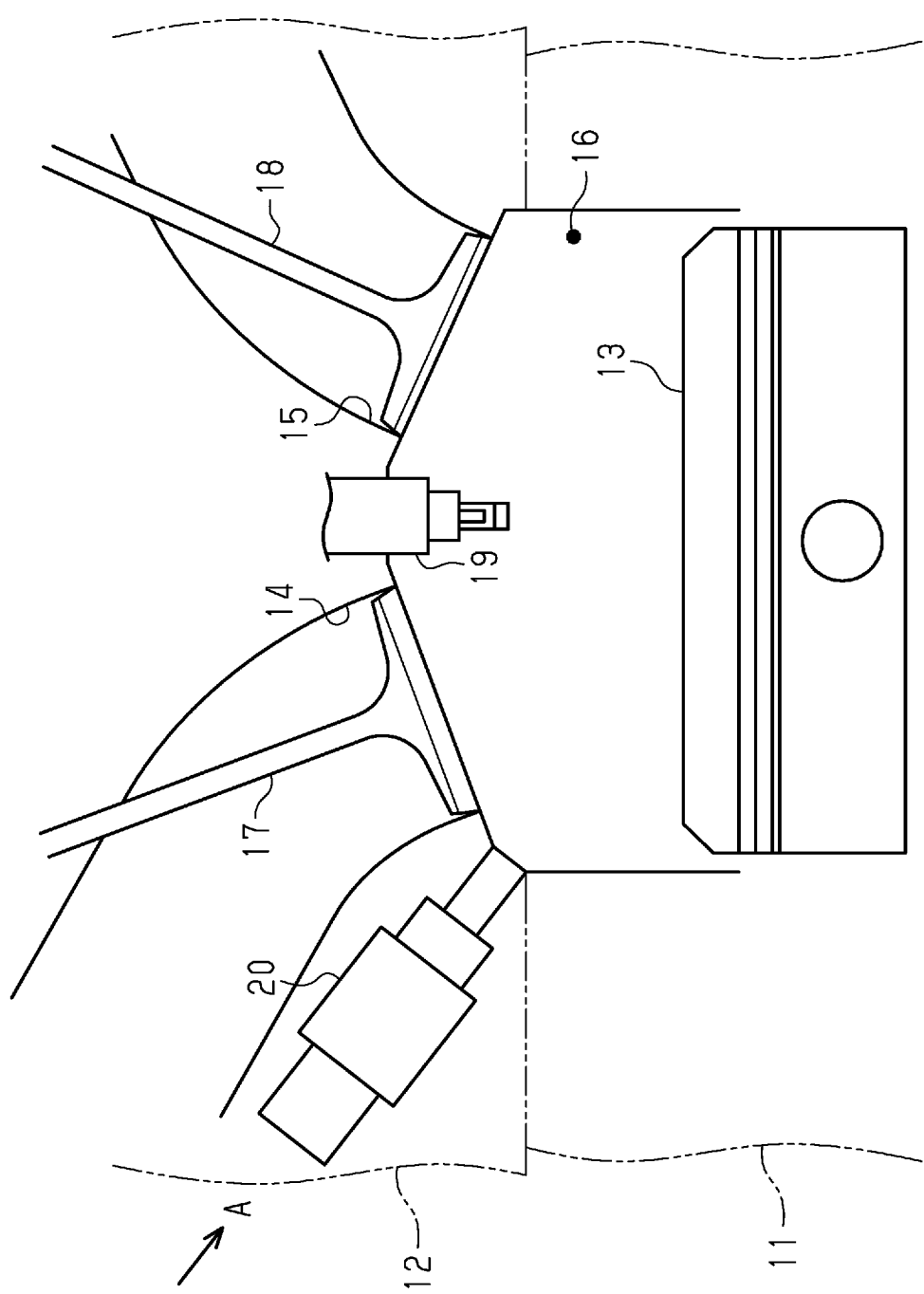
FIG. 1 is a schematic diagram showing a structure of a combustion chamber and its surroundings in an internal combustion engine according to a first embodiment.

As shown in FIG. 1, an internal combustion engine includes a cylinder block 11, a cylinder head 12, and a piston 13. The cylinder head 12 includes intake ports 14 and exhaust ports 15. The intake ports 14 and the exhaust ports 15 are connected to a combustion chamber 16 defined by the cylinder block 11, the cylinder head 12, and the piston 13. The piston 13 reciprocates in the cylinder block 11 as the internal combustion engine operates. Along with the reciprocation of the piston 13, an intake stroke, a compression stroke, an expansion stroke, and an exhaust stroke of the internal combustion engine are repeated.

The cylinder head 12 is provided with intake valves 17, exhaust valves 18, an ignition plug 19, and a fuel injection valve 20. The intake valves 17 open and close in accordance with operation of the internal combustion engine to connect and disconnect the intake ports 14 to and from the combustion chamber 16. The intake valves 17 open in the intake stroke and close in the strokes other than the intake stroke. The exhaust valves 18 open and close in accordance with operation of the internal combustion engine to connect and disconnect the exhaust ports 15 to and from the combustion chamber 16. The exhaust valves 18 open in the exhaust stroke and close in the strokes other than the exhaust stroke.

When the intake valves 17 open in the intake stroke, air is drawn into the combustion chamber 16 through the intake ports 14. Gaseous fuel is injected into the combustion chamber 16 from the fuel injection valve 20. In the compression stroke, the air and the gaseous fuel in the combustion chamber 16 are compressed. The gaseous fuel thus compressed is ignited by the ignition plug 19, whereby the gaseous fuel is burned and shifts to the expansion stroke. Thereafter, the exhaust valves 18 open in the exhaust stroke, and the exhaust gas after the combustion is discharged from the combustion chamber 16 to the exhaust ports 15.

<Detailed Structure of Combustion Chamber 16 and Surroundings in Internal Combustion Engine>

Figure 2:
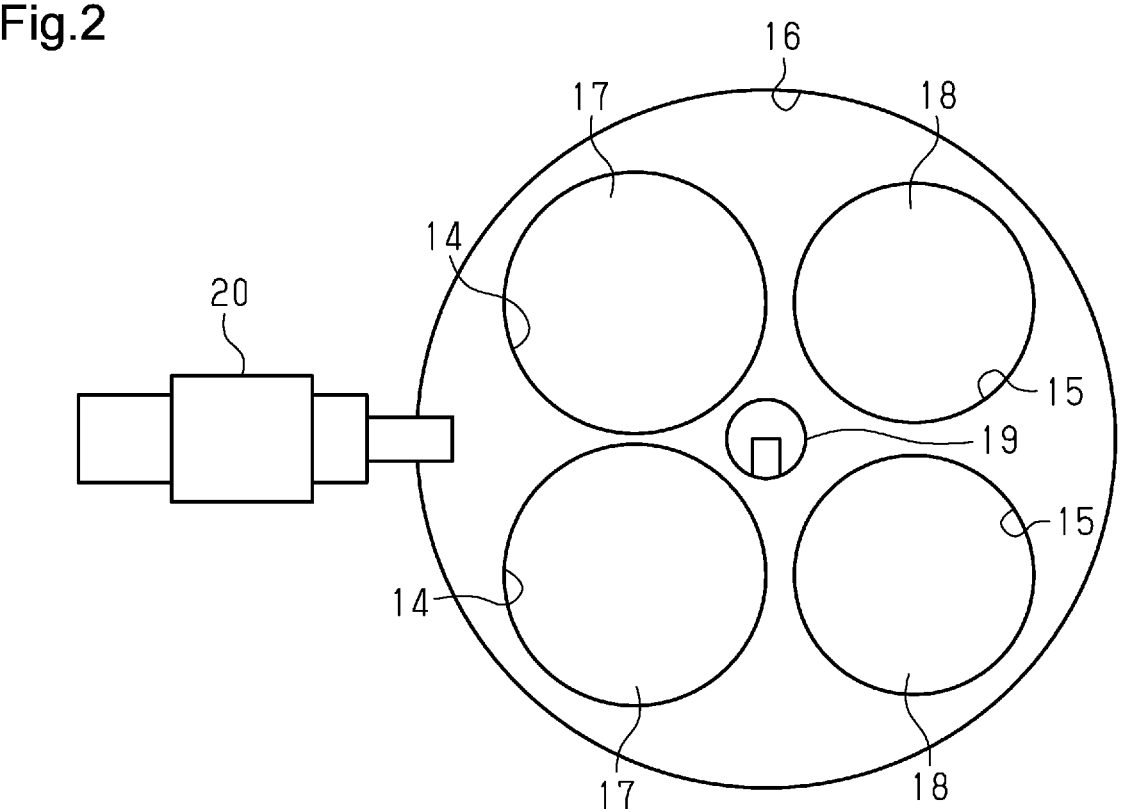
FIG. 2 is a schematic diagram showing the combustion chamber and its surroundings viewed from below in FIG. 1.
Figure 3:
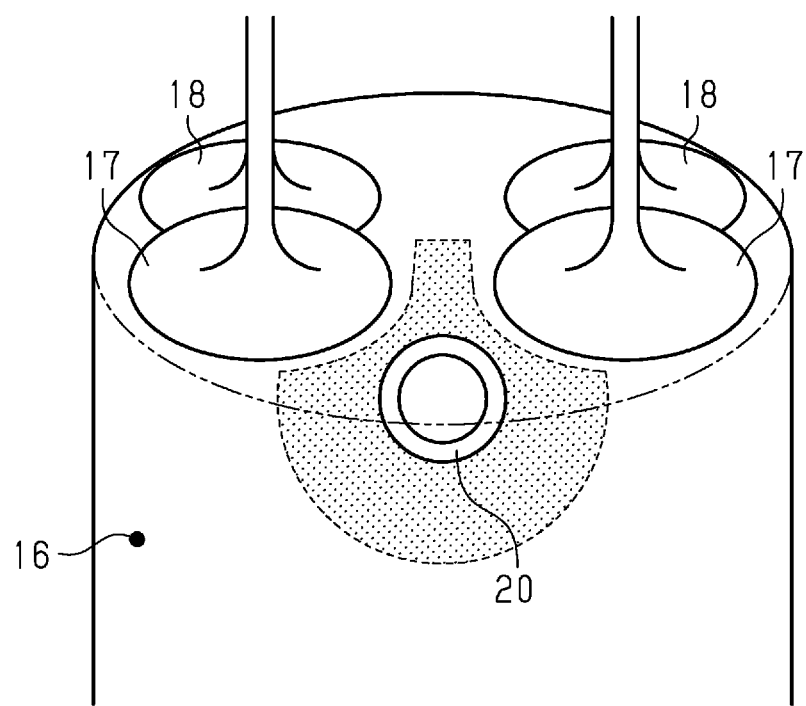
FIG. 3 is a schematic diagram showing the combustion chamber and its surroundings viewed from the direction of arrow A in FIG. 1.

FIGS. 2 and 3 show the combustion chamber 16 and its surroundings as viewed from below in FIG. 1 and in the direction of arrow A in FIG. 1, respectively. As can be seen from FIGS. 2 and 3, two intake ports 14 and two intake valves 17 are provided for each combustion chamber 16, and are arranged in parallel in the left half of the combustion chamber 16 in FIGS. 1 and 2. Two exhaust ports 15 and two exhaust valves 18 are provided for each combustion chamber 16, and are arranged in parallel in the right half of the combustion chamber 16 in FIGS. 1 and 2.

As shown in FIG. 2, the ignition plug 19 is disposed at a center of the combustion chamber 16 and between the intake valves 17 and the exhaust valves 18. As shown in FIGS. 1 to 3, the fuel injection valve 20 is inserted into the cylinder head 12 toward the combustion chamber 16, so that the fuel injection valve 20 is disposed at a position corresponding to a portion between the intake ports 14 and closer to the piston 13 than the intake ports 14 are to the piston 13, which correspond to the entire intake passage formed in the cylinder head 12. The fuel injection device of the internal combustion engine includes the fuel injection valve 20.

<Structure of Fuel Injection Valve 20>

Figure 4:
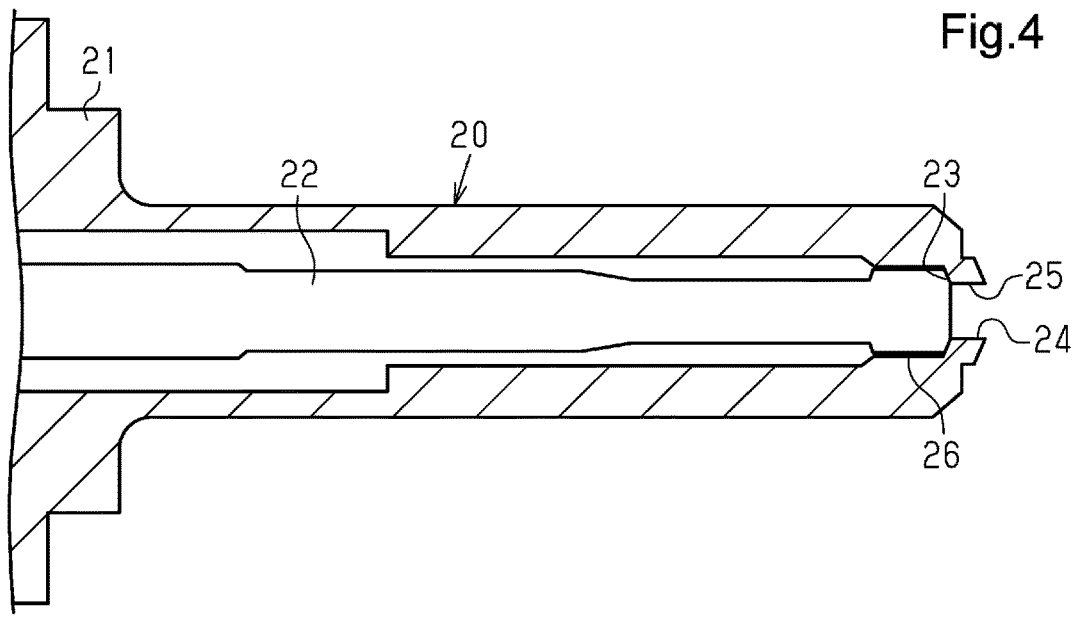
FIG. 4 is a cross-sectional view showing an internal structure of a fuel injection valve of the internal combustion engine shown in FIG. 1.
Figure 5:
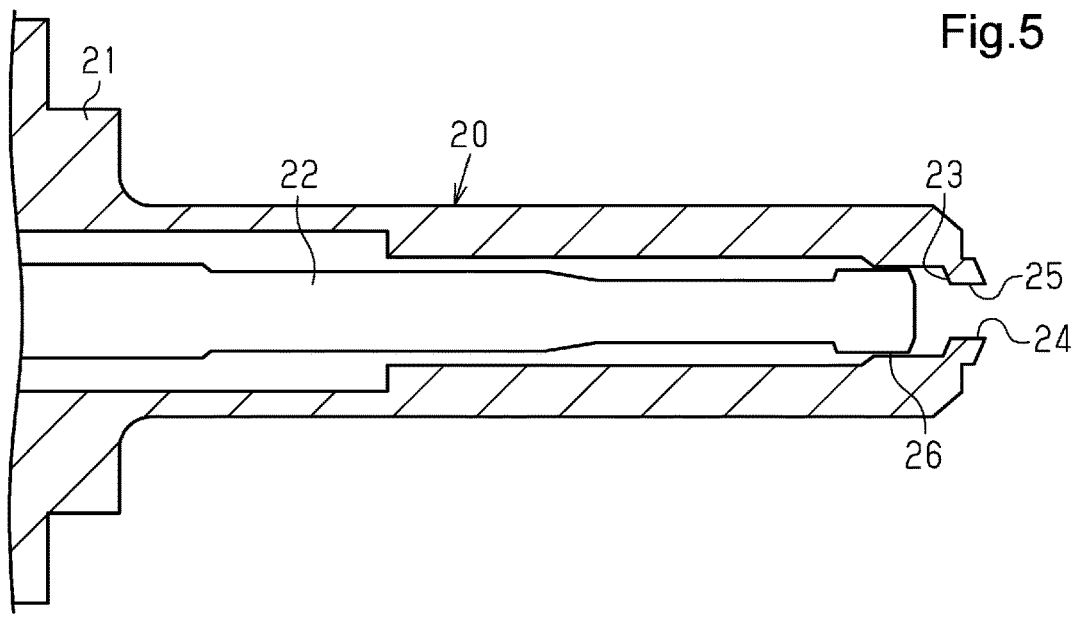
FIG. 5 is a cross-sectional view showing an internal structure of the fuel injection valve of the internal combustion engine shown in FIG. 1.

As shown in FIGS. 4 and 5, a needle 22 and a valve seat 23 are disposed inside a body 21 of the fuel injection valve 20. The gaseous fuel is supplied to the interior of the body 21. The body 21 includes a single injection hole 24 extending from the valve seat 23 toward the combustion chamber 16 (FIG. 1) of the internal combustion engine. The injection hole 24 is connected to the combustion chamber 16. A single fuel injection passage 25 is defined by an inner wall of the injection hole 24. The fuel injection passage 25 is for conducting the gaseous fuel, and is located between the valve seat 23 of the fuel injection valve 20 and the combustion chamber 16.

The needle 22 is movable in the longitudinal direction of the needle 22 inside the body 21 by the elastic force of a spring and the electromagnetic force of an electromagnetic solenoid. Thus, the needle 22 moves toward and away from the valve seat 23. A valve member 26 is formed at an end of the needle 22 close to the valve seat 23.

The fuel injection valve 20 closes by bringing the needle 22 close to the valve seat 23 and pressing the valve member 26 against the valve seat 23 as shown in FIG. 4. The fuel injection valve 20 opens by moving the needle 22 in a direction in which the valve member 26 moves away from the valve seat 23 as shown in FIG. 5, thereby injecting the gaseous fuel into the combustion chamber 16. At this time, the gaseous fuel is injected into the combustion chamber 16 through the interior of the injection hole 24 of the fuel injection valve 20, i.e., through the fuel injection passage 25.

<Shape of Flow Cross Section of Gaseous Fuel in Fuel Injection Passage 25>

Figure 6:
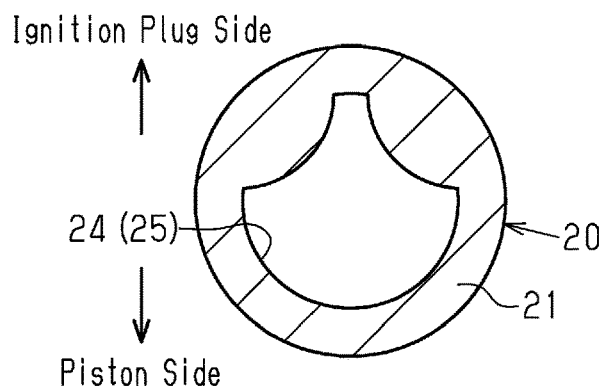
FIG. 6 is a cross-sectional view showing a flow cross section of gaseous fuel of an injection hole in the fuel injection valve shown in FIGS. 4 and 5.

FIG. 6 shows a flow cross section of the gaseous fuel in the fuel injection passage 25. As can be seen from FIG. 6, the flow cross section of the fuel injection passage 25 is larger on a side closer to the piston 13 of the internal combustion engine than on a side closer to the ignition plug 19 of the internal combustion engine. In other words, the flow cross section is larger on the lower side in FIG. 1 than on the upper side in FIG. 1.

In the flow cross section of the fuel injection passage 25, a flow cross section on the side closer to the ignition plug 19 has a shape protruding toward the ignition plug 19 from the flow cross section on the side closer to the piston 13. Further, in the flow cross section of the fuel injection passage 25, the flow cross section on the side closer to the ignition plug 19 has a symmetrical shape with respect to a center of the fuel injection passage 25 in an arrangement direction of the intake ports 14, i.e., in the lateral direction of FIG. 6.

The flow cross section of the fuel injection passage 25 has the above-described shape over a specified length in an extending direction of the fuel injection passage 25.

Next, the operational advantages of the fuel injection device according to the present embodiment will be described.

(1-1) When gaseous fuel is injected into the combustion chamber 16 from the fuel injection valve 20, it is preferable to mix the gaseous fuel and the air in the combustion chamber 16 such that the gaseous fuel and the air are homogeneously mixed in order to reduce NOx generated after combustion of the gaseous fuel. However, for example, when the gaseous fuel is widely injected from the fuel injection valve 20 so that the gaseous fuel and the air are homogeneously mixed in the combustion chamber 16, the injected gaseous fuel may hit components such as the intake valves 17 and the exhaust valves 18.

In the fuel injection device described above, the gaseous fuel injected from the fuel injection valve 20 passes through the fuel injection passage 25, which is located between the valve seat 23 of the fuel injection valve 20 and the combustion chamber 16, and is then injected into the combustion chamber 16. Therefore, the spread of the gaseous fuel injected into the combustion chamber 16 is affected by the shape of the flow cross section of the gaseous fuel in the fuel injection passage 25. The shape of the flow cross section is larger on the side closer to the piston 13 of the internal combustion engine than on the side closer to the ignition plug 19 of the internal combustion engine. Therefore, the gaseous fuel injected from the fuel injection valve 20 into the combustion chamber 16 is prevented from spreading toward the ignition plug 19 in the combustion chamber 16. This prevents the gaseous fuel from hitting components such as the intake valves 17 and the exhaust valve 18 in the combustion chamber 16.

If the gaseous fuel injected from the fuel injection valve 20 into the combustion chamber 16 hits the intake valves 17 at the end of the opening process, the gaseous fuel may enter the intake ports 14 after hitting the intake valves 17. In this case, when the intake valves 17 open next time, the gaseous fuel is also drawn into the combustion chamber 16 together with the air drawn into the combustion chamber 16 from the intake ports 14, and the gaseous fuel may come into contact with a high-temperature portion such as the exhaust valves 18 to cause abnormal combustion. In addition, even when the gaseous fuel injected from the fuel injection valve 20 into the combustion chamber 16 directly hits the exhaust valves 18, the gaseous fuel may be ignited by the exhaust valves 18 having a high temperature to cause abnormal combustion. However, the occurrence of such abnormal combustion is prevented by preventing the gaseous fuel injected from the fuel injection valve 20 from hitting the intake valves 17 or the exhaust valves 18 as described above.

(1-2) In the flow cross section of the fuel injection passage 25, the flow cross section on the side closer to the ignition plug 19 has a shape protruding toward the ignition plug 19 from the flow cross section on the side closer to the piston 13. Further, the flow cross section on the side closer to the ignition plug 19 has a symmetrical shape with respect to the center of the fuel injection passage 25 in the arrangement direction of the intake ports 14. This allows the gaseous fuel injected from the fuel injection valve 20 into the combustion chamber 16 to spread as indicated by the broken line in FIG. 3. As a result, the gaseous fuel is prevented from spreading toward the intake valves 17 in the combustion chamber 16.

(1-3) The structure that prevents the gaseous fuel from hitting the components such as the intake valves 17 and the exhaust valves 18 in the combustion chamber 16 is provided by the injection hole 24 in the body 21 of the fuel injection valve 20. Specifically, the fuel injection passage 25 is formed by the inner wall of the injection hole 24. Therefore, the use of the fuel injection valve 20, which includes the above-described fuel injection passage 25, prevents the gaseous fuel from hitting components such as the intake valves 17 and the exhaust valves 18 in the combustion chamber 16, so that it is not necessary to change portions other than the fuel injection valve 20 in the internal combustion engine.

Second Embodiment

Next, a fuel injection device according to a second embodiment will be described with reference to FIGS. 7 and 8.

Figure 7:
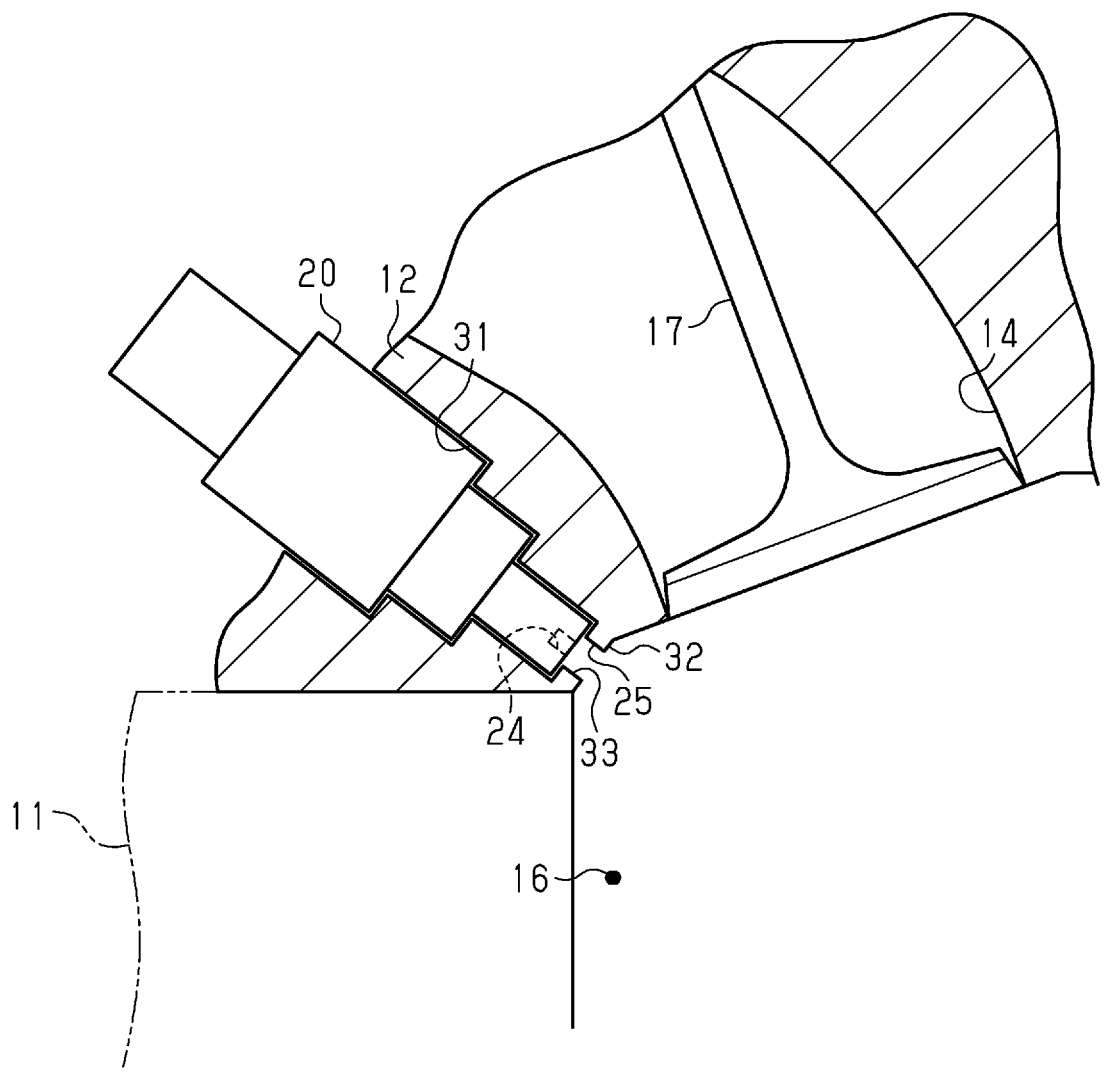
FIG. 7 is an enlarged cross-sectional view showing a fuel injection valve and its surroundings in an internal combustion engine according to a second embodiment.
Figure 8:
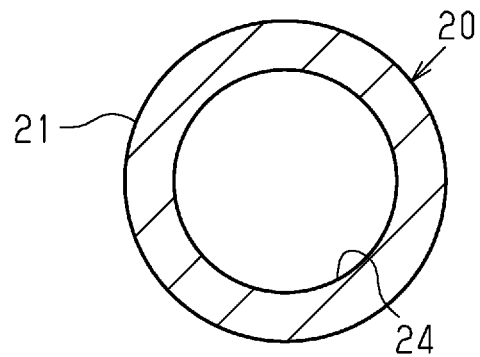
FIG. 8 is a cross-sectional view showing a flow cross section of gaseous fuel of an injection hole in the fuel injection valve of the internal combustion engine shown in FIG. 7.

In this embodiment, the fuel injection passage 25 is formed in the cylinder head 12 of the internal combustion engine as shown in FIG. 7, instead of forming the fuel injection passage 25 in the fuel injection valve 20 as in the first embodiment. Specifically, the cylinder head 12 includes an insertion portion 31, into which the fuel injection valve 20 is inserted. The cylinder head 12 includes a through-hole 33 in a partition wall 32 that separates the insertion portion 31 from the combustion chamber 16. The through-hole 33 connects the injection hole 24 of the fuel injection valve 20 and the combustion chamber 16 to each other. The fuel injection passage 25 of this embodiment is formed by the inner wall of the through-hole 33. As shown in FIG. 8, the flow cross section of the gaseous fuel in the injection hole 24 of the fuel injection valve 20 according to this embodiment is circular.

With this embodiment, the following advantages are achieved in addition to the advantages (1-1) and (1-2) of the first embodiment.

(2-1) The structure for preventing gaseous fuel from hitting the components such as the intake valves 17 and the exhaust valves 18 in the combustion chamber 16 is provided by the through-hole 33 in the partition wall 32 between the injection hole 24 of the fuel injection valve 20 in the cylinder head 12 and the combustion chamber 16. Specifically, the fuel injection passage 25 is formed by the inner wall of the through-hole 33. Therefore, only by forming the fuel injection passage 25 by the inner wall of the through-hole 33 in the partition wall 32 of the cylinder head 12, it is possible to prevent gaseous fuel from hitting the components such as the intake valves 17 and the exhaust valves 18 in the combustion chamber 16. In this case, it is not necessary for the fuel injection valve 20 to have a dedicated structure in order to prevent gaseous fuel from hitting components such as the intake valves 17 and the exhaust valves 18 in the combustion chamber 16. Therefore, it is possible to increase the flexibility in design of the fuel injection valve 20, such as designing the fuel injection valve 20 to be suitable for increasing the fuel injection amount.

Other Embodiments

The above-described embodiments may be modified to the forms described below, for example. The above-described embodiments and the following modifications can be combined if the combined modifications remain technically consistent with each other.

Figure 9:
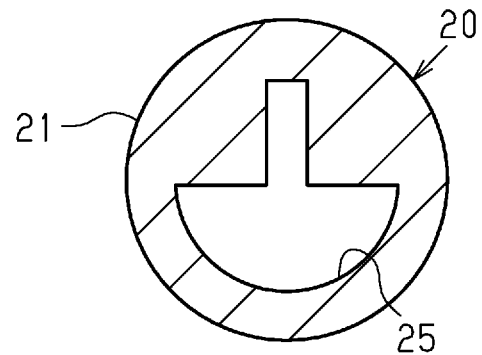
FIG. 9 is a cross-sectional view showing another example of a flow cross section of gaseous fuel in a fuel injection passage.
Figure 10:
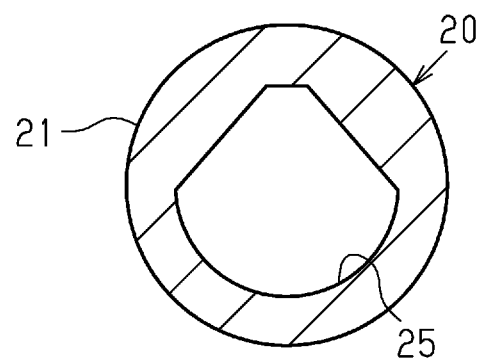
FIG. 10 is a cross-sectional view showing another example of a flow cross section of gaseous fuel in a fuel injection passage.
Figure 11:
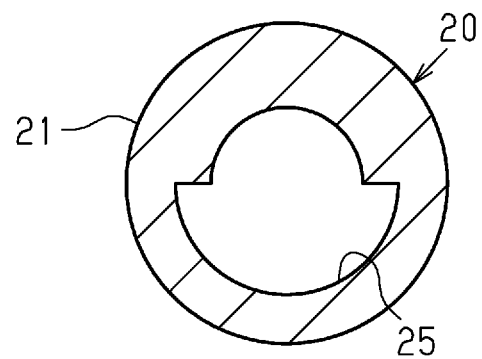
FIG. 11 is a cross-sectional view showing another example of a flow cross section of gaseous fuel in a fuel injection passage.

In the first and second embodiments, the flow cross section of the gaseous fuel in the fuel injection passage 25 may be changed. For example, the flow cross section may be changed to shapes shown in FIGS. 9 to 11.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fuel injection device, comprising:
a fuel injection valve disposed at a position in an internal combustion engine that corresponds to a portion between intake ports, wherein
the fuel injection valve includes:
a body; and
a needle inside the body,
the fuel injection valve is configured to
close by pressing the needle against a valve seat; and
open by moving the needle away from the valve seat, thereby injecting gaseous fuel into a combustion chamber of the internal combustion engine,
the fuel injection valve is disposed closer to a piston of the internal combustion engine than the intake ports are to the piston,
a single fuel injection passage for conducting the gaseous fuel is present between the valve seat and the combustion chamber,
a flow cross section of the gaseous fuel in the fuel injection passage is defined as a cross section perpendicular to an extending direction of the fuel injection passage, and
the flow cross section of the gaseous fuel in the fuel injection is larger on a side closer to the piston of the internal combustion engine than on a side closer to an ignition plug of the internal combustion engine over a specified length in the extending direction of the fuel injection passage.

2. The fuel injection device according to claim 1, wherein in the flow cross section of the fuel injection passage, a flow cross section on the side closer to the ignition plug has a shape protruding toward the ignition plug from the flow cross section on the side closer to the piston, and has a symmetrical shape with respect to a center of the fuel injection passage in an arrangement direction of the intake ports.

3. The fuel injection device according to claim 1, wherein
a single injection hole for injecting the gaseous fuel is formed in the body so as to extend from the valve seat toward the combustion chamber, and
the fuel injection passage is formed by an inner wall of the injection hole.

4. The fuel injection device according to claim 1, wherein
a single through-hole, through which the gaseous fuel injected from the fuel injection valve passes, is formed in a member between the fuel injection valve and the combustion chamber in the internal combustion engine, and
the fuel injection passage is formed by an inner wall of the through-hole.

* * * * *